United States Patent
Nath (10) Patent No.: US 11,151,293 B2
(45) Date of Patent: Oct. 19, 2021

(54) METHOD AND SYSTEM FOR DATA ANALYSIS USING A STATISTICAL MODEL IN ONE OR MORE CONTEXTS

(71) Applicant: Infosys Limited, Bangalore (IN)

(72) Inventor: Subhashis Nath, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 388 days.

(21) Appl. No.: 15/927,707

(22) Filed: Mar. 21, 2018

(65) Prior Publication Data

US 2019/0188341 A1 Jun. 20, 2019

(30) Foreign Application Priority Data

Dec. 19, 2017 (IN) .............................. 201741045674

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ............................ G06F 30/20; G06F 2111/10
See application file for complete search history.

(56) References Cited

U.S. PATENT DOCUMENTS

| | | | |
|---|---|---|---|
| 9,454,743 B2 * | 9/2016 | Braman | G06F 30/20 |
| 2007/0147685 A1 * | 6/2007 | Ericson | G06K 9/6253 |
| | | | 382/225 |
| 2012/0150820 A1 * | 6/2012 | Sankaranarayanan | |
| | | | G06F 16/215 |
| | | | 707/690 |
| 2013/0138626 A1 | 5/2013 | Delafranier et al. | |
| 2013/0159832 A1 * | 6/2013 | Ingargiola | G06Q 40/00 |
| | | | 715/220 |
| 2014/0108396 A1 * | 4/2014 | Hobbs | G06F 16/2462 |
| | | | 707/736 |
| 2014/0337320 A1 | 11/2014 | Hernandez et al. | |
| 2015/0186334 A1 * | 7/2015 | Weller | G06F 40/186 |
| | | | 702/179 |

(Continued)

OTHER PUBLICATIONS

Kridel, Don, and Daniel Dolk. "Automated self-service modeling: predictive analytics as a service." Information Systems and e-Business Management 11, No. 1 (2013): 119-140. (Year: 2011).*

(Continued)

*Primary Examiner* — Chuen-Meei Gan
(74) *Attorney, Agent, or Firm* — Troutman Pepper Hamilton Sanders LLP (Rochester)

(57) ABSTRACT

A method and system for analyzing data based on a statistical model, wherein the statistical model is used in one or more contexts without needing intervention of data scientists. This statistical model is parameterized and uploaded in an analytics platform. Parameterizing the statistical model enables end users to select scope, constraints and variables of data analysis. Acceptance indicator of this tool indicates reliability of the model on user selected scope, constraints and variables. Based on user selections, a dynamic table is created which is an input to the statistical model for data analysis. Based on values of this dynamic table, data analysis is performed on stored data on the specific context. The report id generated based on the data analysis which is presented to user as visual output.

6 Claims, 5 Drawing Sheets

(56) References Cited

U.S. PATENT DOCUMENTS

2017/0300657 A1* 10/2017 Barrett .................. G06F 16/245

OTHER PUBLICATIONS

Kridel et al., "Automated Self-Service Modeling: Predictive Analytics as a Service", Dec. 13, 2011, 23 pages, Springer-Verlag.
Qlik, "Evaluting Governed Self-Service Data Visualization", 2014, 16 pages, QlikTech International AB.
Kobielus et al., "Mighty Mashups: Do-It-Yourself Business Intelligence for the New Economy", Jul. 23, 2009, 20 pages, Forrester Research, Inc.
"The NBA Playoffs and Composable Self Service Analytics", May 10, 2016, 9 pages.

* cited by examiner

METHOD AND SYSTEM FOR DATA ANALYSIS USING A STATISTICAL MODEL IN ONE OR MORE CONTEXTS

This application claims the benefit of Indian Patent Application Serial No. 201741045674, filed Dec. 19, 2017, which is hereby incorporated by reference in its entirety.

FIELD

This invention relates generally to data analytics, and in particular, to a method and system for analyzing data based on a statistical model, wherein the statistical model is used in one or more contexts.

BACKGROUND

Data analytics is a complex domain and application dependent. It requires constant interaction between data scientist and business analysts to come up with a model to analyze data stored in databases. However, the advent of exponential data processing process and cloud models provides end users easy access to data, storage, computation and eventually self-service analytics.

Presently, in self-service analytics products, user interface and workflow is hardcoded and can be applied to only the use case they are built for and primarily in visual and descriptive analytics. Predictive analytics models that are opened up to business users today are frozen i.e. no additional attributes can be added to the same or no attributes can be modified in the existing statistical model on which the product is built, nor constraints added. If an end user wants to analyze data for different attributes than those that have been used for another model applied to a similar use case, then the data scientist would need to write a separate code for the same. Further, some self-service analytics tools exist which choose appropriate analytical model out of different analytical models. Additionally, as mentioned before, self-service analytical tools that industry knows of only offer self-service visualization. Currently, no mechanism is present by which a single statistical model can be used to analyze data in different contexts, and provide a color coded indication of statistical validity based on updated data and self-service selections.

SUMMARY

The present invention overcomes the above mentioned drawbacks by creating a statistical model which can be used by business users in different contexts without needing repeated interventions from data scientists. According to the present embodiment, a method for analyzing data based on a statistical model is disclosed. The method includes parameterizing the statistical model containing a plurality of variables, receiving at least one of the plurality of variables selected by a user for data analysis, creating a dynamic table based on the at least one of the plurality of selected variables. The dynamic table is an input to the statistical model for data analysis. Then, the data are analyzed by using the statistical model based on values of the dynamic table and finally, a report is generated based on the data analysis.

In an additional embodiment, a system for analyzing data based on a statistical model is disclosed. The system includes a memory coupled to one or more processors which are configured to execute programmed instructions stored in the memory including parameterizing the statistical model containing a plurality of variables, receiving at least one of the plurality of variables selected by a user for data analysis, creating a dynamic table based on the at least one of the plurality of selected variables wherein the dynamic table is an input, to the statistical model for data analysis, analyzing the data by using the statistical model based on values of the dynamic table and generating a report based on the analysis of the data.

In another embodiment of the present disclosure, a non-transitory computer readable storage medium for analyzing data based on a statistical model is disclosed. The computer readable storage medium which is not a signal stores computer executable instructions for parameterizing the statistical model containing a plurality of variables, receiving at least one of the plurality of variables selected by a user for data analysis, creating a dynamic table based on the at least one of the plurality of selected variables wherein the dynamic table is an input, along with any other data that was not exposed to the user for selection, to the statistical model for data analysis, analyzing the data by using the statistical model based on values of the dynamic table and generating a report based on the analysis of the data.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. These simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a method and system for analyzing data based on a statistical model, wherein the statistical model is used in one or more contexts without needing intervention of data scientists. This statistical model is parameterized and uploaded in an analytics platform. Parameterizing the statistical model enables end users to select scope, constraints and variables of data analysis. Based on user selections, a dynamic table is created which is an input to the statistical model for data analysis. Based on values of this dynamic table, data analysis is performed on stored data on the specific context. The report is generated based on the data analysis which is presented to user as visual output.

Figure 1:
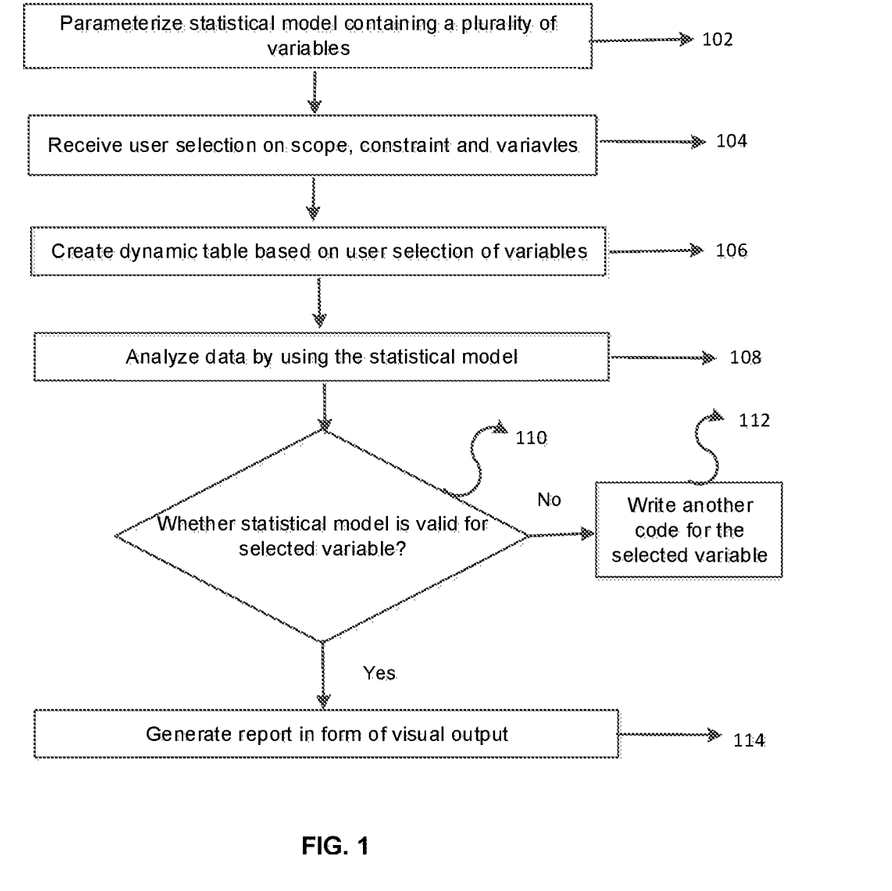
FIG. 1 is a flowchart, illustrating a method for analyzing data based on a statistical model, in accordance with an embodiment of the present invention.

FIG. 1 is a flowchart, illustrating a method for analyzing data based on a statistical model, in accordance with an embodiment of the present invention. This method is enabled on a platform. The statistical model containing a plurality of variables is parameterized at step 102. When a traditional statistical model code is written, it is typically written for a certain set of prepared data and as such is "hard coded" to refer to this exact data. However, if the code is written in such a way that it refers to an area of the data set which will be populated based on user selections, then it can be said that the model is "parameterized". The code, in this case, will operate with different data elements based on user selection. This user selection drives the variables selected for the model. For example, in a customer segmentation model, variables could be recency, frequency, monetary, age, income, education, and ethnicity. If a business user wishes to leave out ethnicity and add a variable like gender, he is effectively de-selecting the parameter called ethnicity and adding new parameter called gender. The list of parameters that can be selected/de-selected by the user are determined and provided by the data scientist who wrote the code. The above example is given for understanding purpose only and does not intend to limit scope of this disclosure. User selection on scope, constraints and variables are received at step 104. Since the statistical model is parameterized, user can select the scope, constraint and variables for which he wants to obtain an insight. All these allowed choices are created by the data scientist.

Scope: This is the selection that drives the scope of data taken for the model. The scope can be time based (for example, data for last two years), or category based (for example, data apply for toys and dry groceries) or geography based (for example, data apply only for a particular city). The column on which scope will apply is selected by the data scientist while creating the model.

Constraint: When the data scientist develops a model he asks the end users certain questions that are needed to execute the model correctly. Examples of such questions may include "how many clusters the end user want?" or "how many months of non-buying is defined as churn in end user's category?" Answers to these questions are essential in running the model. These questions are termed as "constraints".

Variables: This has been described in detail hereinabove with respect to parameters. Examples of variables in customer segmentation model may include recency, frequency, monetary, age, income, education, ethnicity and so on.

Once the end user made the selection on scope, constraints and variable then a dynamic table is created based on user selection of variables at step 106. Leveraging the dynamic table, the statistical model is run to analyze data at step 108. Based on the model output, it is determined by the tool that if the statistical model is valid for such selections at step 110. If this model is valid for the choices made by the end user, then the acceptance indicator provides a green signal. On contrary, if the model is not valid for the user choices, then acceptance indicator provides red signal. If acceptance indicator provides red signal, then the data scientist needs to write a new code for that particular user selection at step 112. If acceptance indicator provides green signal, then report is generated as a form of visual output at step 114. The statistical measures used to determine this acceptance criteria may include but are not limited to R squared, p-value, confidence index or Silhouette index, and in fact depend on the model that the data scientist has written and validation indices that the data scientist has chosen. The platform in which this statistical model is implemented must have access to the big data or enterprise data environment that has access to the data that may be needed during data analysis by the model. All existing statistical models point to a particular table where the data scientists store variable values based on data transformation or preparation equations that would take values from existing data and create the variable values needed by the model.

Figure 2:
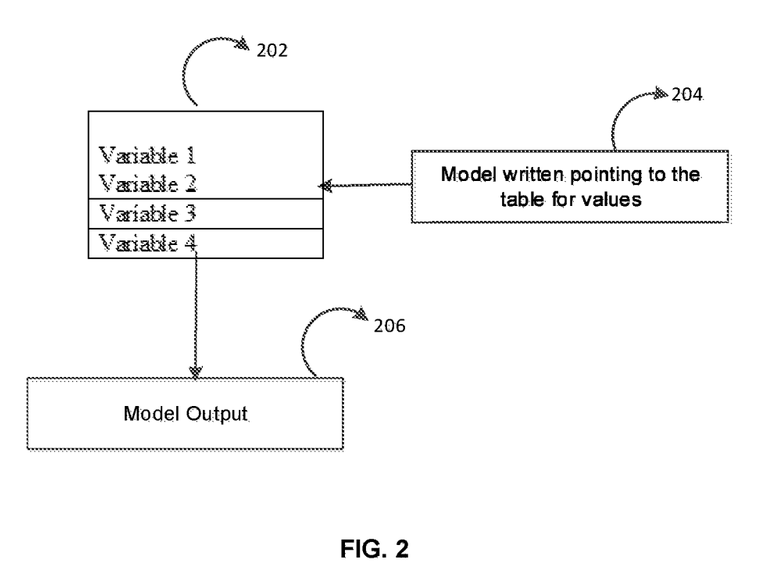
FIG. 2 is a diagram illustrating a method of data analysis referring to a table created by a data scientist, in accordance with existing ways of modeling.

FIG. 2 is a diagram illustrating a method of data analysis referring to a table created by a data scientist, in accordance with an embodiment of the present invention. In this diagram, if the statistical model is invoked, then it refers to a table 202 created by data scientist for variable values at 204. Based on the values of that table 202, model provides output at 206. However, in the present invention, the parameterized code would point to a similar table except the values would be created based on the data set selected by the end user and the data for a variable would be included only if the user has not de-selected the same.

Figure 3:
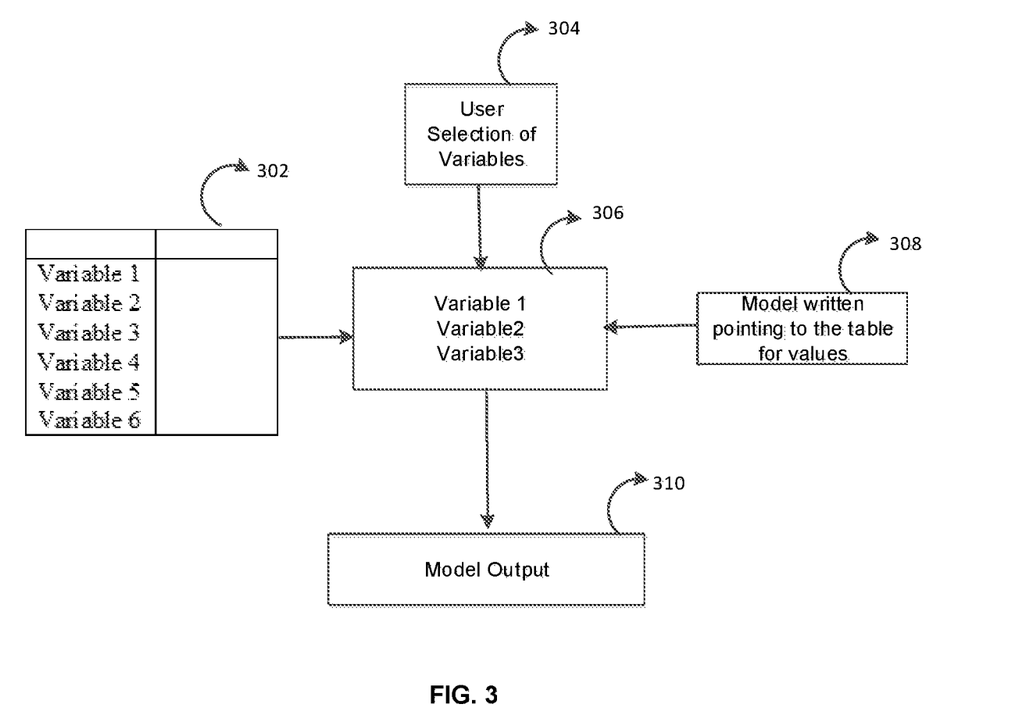
FIG. 3 is a diagram illustrating a method of data analysis referring to a dynamic table, in accordance with an embodiment of the present invention.

FIG. 3 is a diagram illustrating a method of data analysis referring to a dynamic table, in accordance with an embodiment of the present invention. In this diagram, table 302 is created by a data scientist and which contains all variables. After end user selects (at 304) scope, constraints and variables for which he needs the analysis, a dynamic table 306 is created from the original table 302 created by data scientist, based on the user selections. Based on this dynamic table 306, the model provides output at 310.

Figure 4:
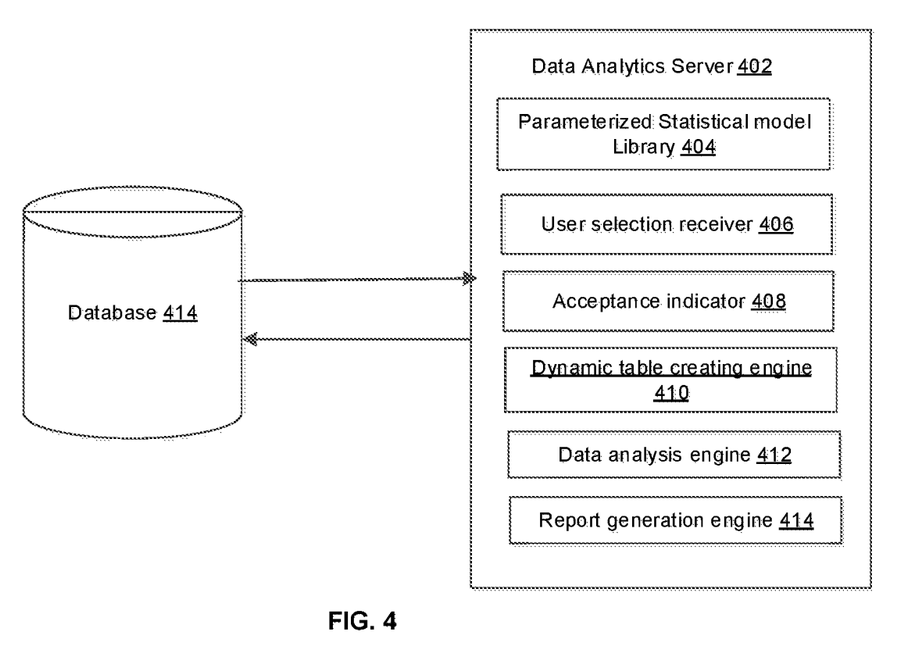
FIG. 4 is an architectural diagram of the system for analyzing data based on a statistical model, in accordance with an embodiment of the present invention.

FIG. 4 is an architectural diagram of the system for analyzing data based on a statistical model, in accordance with an embodiment of the present invention. This includes a database server 402 containing parameterized statistical model library 404, user selection receiver 406, acceptance indicator 408, dynamic table creating engine 410, data analysis engine 412 and report generation engine 414. This database server is in communication with a database 414 storing all data required by the statistical model to provide the output to end user. The parameterized statistical model library 404 helps upload and save the parameterized statistical model so that end user can modify the scope, constraint and variables and run the statistical model for data analysis. Parameterized model is explained in detail hereinabove in relation to step 102 of FIG. 1. User selection receiver 406, receives user choices on scope, constraint and variables. Details on these choices are explained in conjunction with step 104 of FIG. 1. Acceptance indicator 408 indicates the acceptance of user selection for data analysis i.e. whether the statistical model is valid for the selection made by the user. Dynamic table creating engine 410 creates dynamic table based on the user selected scope, constraint and variables. The process of creating dynamic table is explained in detail in conjunction with step 110 of FIG. 1. Data analysis engine 412 analyzes data based on values of dynamic table. This analysis is dependent on the statistical model and varies across the model. One of such analytical method is explained in detail herein below with the help of an example. Report generation engine 414 generates a visual report based on the analysis. The output of the model is stored in a table but the data is depicted using standard views and the user can select different views for the output data from the model.

The present invention can be explained with the below example. This example is given only for understanding purpose and does not intend to limit the scope of the invention. An European bank creates a propensity to default score model, with the help of a data scientist, based on its customers' attributes, such as outstanding loan amounts, number of past defaults, dollar amount of past defaults, current income level, income over the last 5 years, loan amount applied, zip code, complete household income, insurance scheme membership, vehicle ownership. Now, if a branch office of that Bank wants to use that model for customers applying for loan with them and not all European customers, then the data scientist needs to re-write the code unless it is parameterized. If the code is parameterized, the user can select mentioned combination of scope and attributes for which he wants the model to run. The end user can select the scope as a particular branch only, constraints as likely to default in the next 1 year and can select or de-select variables like zip code because for one branch there may not be too many customer zip codes. Based on this selection, the following analysis is done by the tool: model for risk of default is run and risk scores by customers of the branch are made available. Finally, a report is generated in the form of scores by customers which can either be downloaded by the user or saved. The report also depicts the scores in a visual form, with ability given to the user to choose other visual forms.

Figure 5:
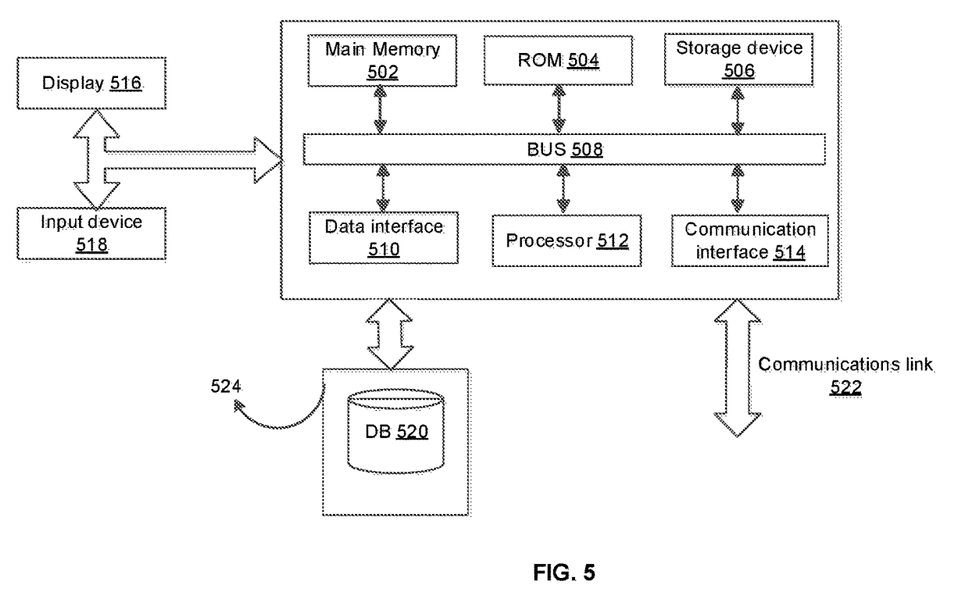
FIG. 5 is a diagram of a computer system with which the present invention can be implemented.

FIG. 5 is a diagram of a computer system with which the present invention can be implemented. In an embodiment of the invention, execution of the sequences of instructions required to practice the invention is performed by a single computer system. According to other embodiments of the invention, two or more computer systems coupled by a communication link 522 may perform the sequence of instructions required to practice the invention in coordination with one another. In order to avoid needlessly obscuring the invention, a description of only one computer system will be presented below; however, it should be understood that any number of computer systems may be employed to practice the invention. Each computer system may include a communication interface 514 coupled to the bus 508. The communication interface 514 provides two-way communication between computer systems. The communication interface 514 of a respective computer system transmits and receives electrical, electromagnetic or optical signals that include data streams representing various types of signal information, e.g., instructions, messages and data. A communication link 522 links one computer system with another computer system. For example, the communication link 522 may be a LAN, in which case the communication interface 514 may be a LAN card, or the communication link 522 may be a PSTN, in which case the communication interface 514 may be an integrated services digital network (ISDN) card or a modem.

A computer system may transmit and receive messages, data, and instructions, including program, i.e., application, code, through its respective communication link 522 and communication interface 514. Received program code may be executed by the respective processor(s) 512 as it is received, and/or stored in the storage device 506, or other associated non-volatile media, for later execution.

In an embodiment, the computer system operates in conjunction with a data storage system 506, e.g., a data storage system 524 that contains a database 520 that is readily accessible by the computer system. The computer system communicates with the data storage system 524 through a data interface 510. A data interface 510, which is coupled to the bus 508, transmits and receives electrical, electromagnetic or optical signals that include data streams representing various types of signal information, e.g., instructions, messages and data. In embodiments of the invention, the functions of the data interface 510 may be performed by the communication interface 514.

Computer system includes a bus 508 or other communication mechanism for communicating instructions, messages and data, collectively, information, and one or more processors 512 coupled with the bus 508 for processing information. Computer system also includes a main memory 502, such as a random access memory (RAM) or other dynamic storage device, coupled to the bus 508 for storing dynamic data and instructions to be executed by the processor(s) 512. The main memory 502 also may be used for storing temporary data, i.e., variables, or other intermediate information during execution of instructions by the processor(s) 512.

The computer system may further include a read only memory (ROM) 504 or other static storage device coupled to the bus 508 for storing static data and instructions for the processor(s) 512. A storage device 506, such as a magnetic disk or optical disk, may also be provided and coupled to the bus 508 for storing data and instructions for the processor(s) 512.

A computer system may be coupled via the bus 508 to a display device 506, such as, but not limited to, a cathode ray tube (CRT), for displaying information to a user. An input device 518, e.g., alphanumeric and other keys, is coupled to the bus 508 for communicating information and command selections to the processor(s) 512.

According to one embodiment of the invention, an individual computer system performs specific operations by their respective processor(s) 512 executing one or more sequences of one or more instructions contained in the main memory 502. Such instructions may be read into the main memory 502 from another computer-usable medium, such as the ROM 504 or the storage device 506. Execution of the sequences of instructions contained in the main memory 502 causes the processor(s) 512 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 512. Such a medium may take many forms, including, but not limited to, non-volatile, volatile and transmission media. Non-volatile media, i.e., media that can retain information in the absence of power, includes the ROM 504, CD ROM, magnetic tape, and magnetic discs. Volatile media, i.e., media that cannot retain information in the absence of power, includes the main memory 502. Transmission media includes coaxial cables, copper wire and fiber optics, including the wires that comprise the bus 508. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method comprising:
parameterizing, by a processor of at least one of one or more computing devices, a financial statistical model code enabled on a platform containing a plurality of variables;
receiving, by the processor of at least one of the one or more computing devices, a selection of a subset of the plurality of variables and scope and constraint choices as inputs from a user for the financial statistical model code, wherein the scope choice is based on at least one of a time, a category, or geography;
creating, by the processor of at least one of the one or more computing devices, a dynamic table populated with data with a dynamic table creating engine based on the subset of the plurality of variables received from the user, wherein the dynamic table is an input to the financial statistical model code for data analysis;
analyzing, by the processor of at least one of the one or more computing devices, the data by executing the financial statistical model code based on values of the dynamic table;
providing, by the processor of at least one of the one or more computing devices, an acceptance indication to the user when the financial statistical model code is valid for the subset of the plurality of variables and the scope and constraint choices received from the user based on one or more statistical measures comprising at least one of R squared, p-value, confidence index, or Silhouette index; and
providing, by the processor of at least one of the one or more computing devices, an automated scored output indicative of a risk assessment in a financial context based on the analysis of the data from the execution of the financial statistical model code.

2. The method of claim 1 further comprising modifying the subset of the plurality of variables and the scope and constraint choices based on additional inputs received from the user.

3. A system, comprising:
one or more processors; and
one or more memories operatively coupled to at least one of the one or more processors and having instructions stored thereon that, when executed by at least one of the one or more processors, cause the at least one of the one or more processors to:
parameterize financial statistical model code enabled on a platform containing a plurality of variables;
receive a selection of a subset of the plurality of variables and scope and constraint choices as inputs from a user for the financial statistical model code, wherein the scope choice is based on at least one of a time, a category, or geography;
create a dynamic table populated with data with a dynamic table creating engine based on the subset of the plurality of variables received from the user, wherein the dynamic table is an input to the financial statistical model code for data analysis;
analyze the data by executing the financial statistical model code based on values of the dynamic table;
provide an acceptance indication to the user when the financial statistical model code is valid for the subset of the plurality of variables and the scope and constraint choices received from the user based on one or more statistical measures comprising at least one of R squared, p-value, confidence index, or Silhouette index; and
provide an automated scored output indicative of a financial risk assessment in a financial context based on the analysis of the data from the execution of the financial statistical model code.

4. The system of claim 3, wherein at least one of the one or more memories has further instructions stored thereon that, when executed by at least one of the one or more processors, cause at least one of the one or more processors to edit the financial statistical model by modifying the subset of the plurality of variables and the scope and constraint choices based on additional inputs received from the user.

5. A non-transitory computer readable medium having stored thereon instructions, the non-transitory computer readable medium comprising machine executable code which when executed by at least one processor, causes the at least one processor to perform steps comprising:
parameterizing financial statistical model code enabled on a platform containing a plurality of variables;
receiving a selection of a subset of the plurality of variables and scope and constraint choices as inputs from a user for the financial statistical model code, wherein the scope choice is based on at least one of a time, a category, or geography;
creating a dynamic table populated with data with a dynamic table creating engine based on the subset of the plurality of variables received from the user, wherein the dynamic table is an input to the financial statistical model code for data analysis;
analyzing the data by executing the financial statistical model code based on values of the dynamic table; and
provide an acceptance indication to the user when the financial statistical model code is valid for the subset of the plurality of variables and the scope and constraint choices received from the user based on one or more statistical measures comprising at least one of R squared, p-value, confidence index, or Silhouette index; and
providing an automated scored output indicative of a financial risk assessment in a financial context based on the analysis of the data from the execution of the financial statistical model code.

6. The system of claim 5, further comprising machine executable code which when executed by at least one processor, causes the at least one processor to perform steps comprising editing the financial statistical model code by modifying the subset of the plurality of variables and the scope and constraint choices based on additional inputs received from the user.

* * * * *